United States Patent [19]

Eggemar

[11] Patent Number: 5,327,737
[45] Date of Patent: Jul. 12, 1994

[54] METHOD AND APPARATUS FOR HEAT EXCHANGE, WHERE CHANNELS, E.G. TUBES, ARE SECURED IN RECESSES IN HEAT-ISOLATING BOARDS

[76] Inventor: Bengt V. Eggemar, Torparmors väg 6, S-162 45 Vällingby, Sweden

[21] Appl. No.: 809,473
[22] PCT Filed: Jun. 27, 1990
[86] PCT No.: PCT/SE90/00461
 § 371 Date: Dec. 24, 1991
 § 102(e) Date: Dec. 24, 1991
[87] PCT Pub. No.: WO91/00488
 PCT Pub. Date: Jan. 10, 1991

[30] Foreign Application Priority Data

Jun. 27, 1989 [SE] Sweden ............... 8902324-6

[51] Int. Cl.⁵ .................. F25C 1/00; F25C 3/02; A63C 19/10; F28F 9/00
[52] U.S. Cl. .................. 62/66; 165/47; 165/49; 165/56; 165/46; 62/235; 237/69
[58] Field of Search ............ 237/69; 62/235, 66; 165/47, 49, 56, 46

[56] References Cited

U.S. PATENT DOCUMENTS

| | | | |
|---|---|---|---|
| 2,955,437 | 10/1960 | Nilsson | 62/235 |
| 4,338,994 | 7/1982 | Hewing et al. | 237/69 |
| 4,576,221 | 3/1986 | Fennesz | 237/69 |
| 4,588,125 | 5/1986 | Lutz | 237/69 |
| 4,646,814 | 3/1987 | Fennesz | 237/69 |
| 4,815,301 | 3/1989 | Deloughery | 62/235 |

FOREIGN PATENT DOCUMENTS

| | | |
|---|---|---|
| 0039446 | 11/1981 | European Pat. Off. . |
| 183112 | 4/1907 | Fed. Rep. of Germany . |
| 1232171 | 1/1967 | Fed. Rep. of Germany ........ 62/235 |
| 2926685 | 7/1980 | Fed. Rep. of Germany . |
| 2924097 | 8/1981 | Fed. Rep. of Germany . |
| 3032095 | 3/1982 | Fed. Rep. of Germany . |
| 437876 | 3/1985 | Sweden . |
| 1592676 | 7/1981 | United Kingdom . |

Primary Examiner—John K. Ford
Attorney, Agent, or Firm—Nies, Kurz, Bergert & Tamburro

[57] ABSTRACT

A method of heat exchange comprises advancing energy-carrying medium in a channel system comprising channel-part lengths (1) which extend in side-by-side mutually parallel relationship, such as hose parts (1), and substantially sheet-like or slab-like base parts (2) which support the channel parts. The method is mainly characterized by supporting and holding channel parts (1) with the aid of at least one pre-fabricated sheet or slab (2) of heat-insulating material, such as so-called cellular plastic material, and by inserting the channel parts (1) into locking grooves (3, 4) included in the slab or sheet, the width of locking grooves, when appropriate, being preferably slightly smaller than the width of a channel part, in appropriate cases the diameter of the channel part. The invention also relates to an arrangement for carrying out the method.

19 Claims, 2 Drawing Sheets

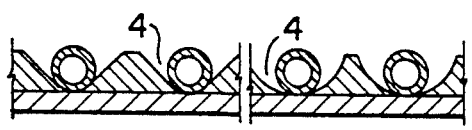
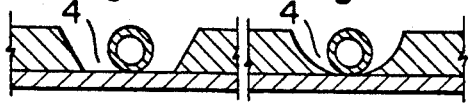
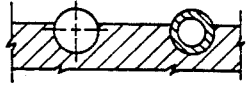
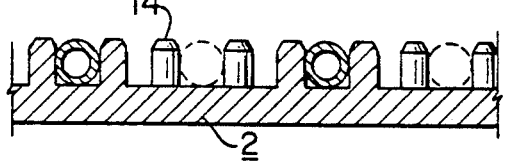
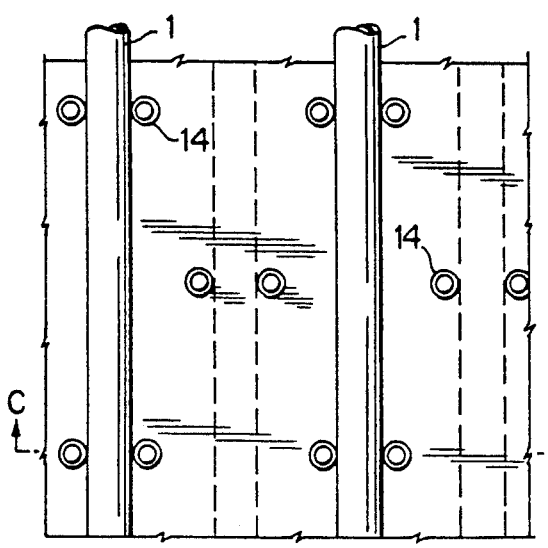
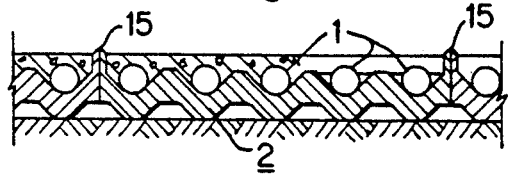
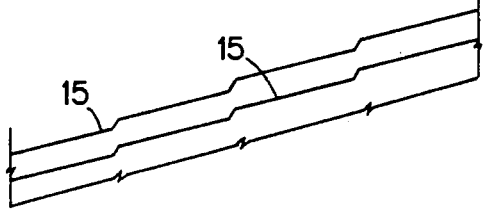
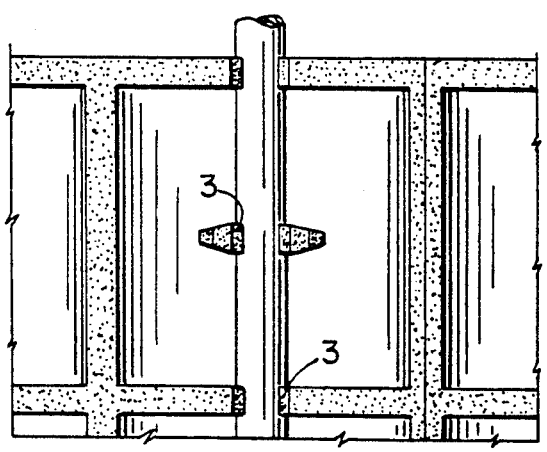
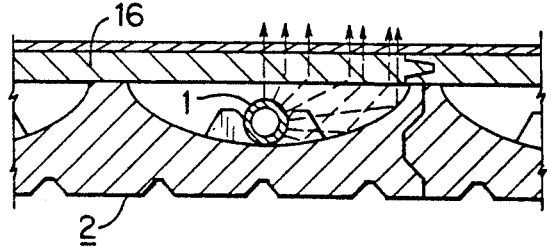

METHOD AND APPARATUS FOR HEAT EXCHANGE, WHERE CHANNELS, E.G. TUBES, ARE SECURED IN RECESSES IN HEAT-ISOLATING BOARDS

The present invention relates to a method of heat-exchange, comprising advancing an energy-carrying medium in a channel system comprising lengths of mutually parallel channel parts, such as hose parts, and supporting said channel parts with the aid of a substantially sheet-or slab-like base element.

The invention also relates to an arrangement for carrying out the method.

The invention is intended primarily for application in the construction of artificially frozen ice-rinks or like playing areas, but can also be applied to produce all kinds of large heat-exchange surfaces, such as so-called heated floors, solar-energy collectors, etc.

In conventional methods of producing artificially frozen playing areas, steel pipes are cast in a concrete bed or anchored loosely in a gravel bed, and, refrigerant, such as ammoniacal liquid, is caused to expand and evaporate. The energy required herefor is taken from the ambient surroundings of the pipes, therewith cooling the surroundings.

Later solutions utilize indirect evaporation techniques, i.e. a frost-protected liquid is chilled with the aid, for instance, of ammonia or freon and is circulated in the channel system of the ice rink, pitch or like area concerned. The pipes used may be made of a plastics material. The plastic pipes are anchored in reinforcement netting or the like and are embedded or anchored in some other way, and then covered with gravel, such as to provide a cooling surface for the production of an artificially frozen ice-rink or like area.

According to one method of laying cooling pipes in gravel beds, there is first formed a layer of asphalt concrete which is provided with grooves on the outer surface thereof for accommodation of the cooling pipes. The cooling pipes, often in the form of hoses, are then placed in the grooves and surrounded or packed with sand, up to the level of the upper edge of the asphalt layer. The surface is covered with a fibre fabric, for instance a geofabric, and a layer of gravel material is laid to a depth of about 50 mm, with the intention of preventing the hoses from moving out of the grooves as a result of linear expansion in summer time. The hoses are thus held in position by the weight of the gravel in combination with pressure distribution from the fibre fabric. The hoses placed in said asphalt grooves or in some other grooved material can also be covered with concrete, which anchors the hoses and protects the same against mechanical action and the effect of degrading UV-light. A construction of hoses in a grooved base material covered, for instance, with gravel or concrete can be used as a cooling surface for artificially frozen ice rinks, as a heated floor or as a solar energy collector on the ground, on a separate framework or on the roof of a building.

An analysis has shown that the following technical desiderata and considerations are common to such constructions:

Heat transfer from/to the undersurface of the construction should be screened with an insulating material, so as to direct heat transportation from/to the hoses to a layer which essentially covers the outer layer of the construction.

The hoses should be densely packed, so as to achieve a large hose-surface area and therewith a more uniform distribution of temperature from/to said surface layer and lower resistance to heat transportation through the walls of the hoses.

It should be relatively simple to anchor the hoses in conjunction with placing said hoses on the base element, since varying temperatures and solar radiation will result in an increase/decrease of the hose temperature, therewith causing the hoses to move prior to being finally anchored, by packing said hoses with an appropriate material.

The material packed around and over the hoses, up to the surface of the construction, should have a high thermal conductivity, so as to achieve the lowest possible temperature drop through said material. The material should also be in good contact with the outer surfaces of the hoses, so as to achieve the lowest possible resistance to the transfer of heat to/from the hose walls.

The thermal mass of the covering material will influence the reaction rate in the construction when the thermal load from/to the surface of the construction varies. For instance, a decrease in the temperature of the refrigerant in the hoses of an artificially frozen ice rink, or an increase in the temperature of a heat carrier in a heated floor is considerably delayed with changed temperatures on the surface of the construction in proportion to the thickness of the covering layer and the total thermal mass.

The present invention relates, to a solution in which rational assembly incorporating a small number of mutually different components is integrated in a construction which includes screening insulation on the undersurface, thereof, dense hose distribution, locking of hoses against longitudinal and vertical movement, low heat-transfer resistance from hoses to covering material and a low coefficient of thermal conductivity and low thermal mass of the covering material, said solution eliminating the drawbacks of known solutions and providing important advantages in the form, inter alia, of effective use of energy and good drainage.

The invention thus relates to a method of heat exchange in which an energy-carrying medium is advanced in a channel system comprising mutually parallel and adjacent channel parts, such as hose parts, and supporting said channel parts on essentially sheet or slab-like base members. The method is mainly characterized in that channel parts are carried and held by at least one pre-fabricated sheet of heat-insulating material, such as so-called cellular plastic material, and in that said channel parts are laid-out in locking grooves formed in said sheet and, when applicable, having a width which is slightly smaller than the width of a channel part, in applicable cases the diameter of a channel part.

The invention also relates to a heat-exchanger arrangement in which the exchange of heat is effected by advancing an energy-carrying medium in a channel system comprising mutually parallel and adjacent channel parts, such as hose parts, supported by essentially sheet or slab-like base parts. The arrangement is mainly characterized by at least one pre-fabricated sheet of heat-insulating material, such as so-called solar plastic material, for supporting channel parts, said sheet including channel-part locking grooves which extend in the intended length direction of the channel parts and which, in applicable cases, have a width which is preferably slightly smaller than the width of a channel part, and when applicable receives the diameter of the channel part.

The invention will now be described in more detail with reference to the accompanying drawings, in which FIG. 1 illustrates schematically part of a first embodiment of a channel part supporting sheet or slab, said sheet being seen from above;

FIG. 9a through FIG. 9h illustrate various vertical-sections of grooves formed in channel parts, certain of said grooves constituting locking grooves;

FIG. 10 illustrates schematically the formation of locking grooves with the aid of studs which are shown in vertical section taken on the line C—C in FIG. 11;

FIG. 11 illustrates the arrangement of FIG. 10;

FIG. 12 is a schematic, vertical sectional view taken transversely through the channel parts of a fifth heat-exchanger arrangement, where a concrete surface covering has been cast on site;

FIG. 13 is a schematic, sectional view of a sixth heat-exchanger arrangement essentially similar to FIG. 12, where a concrete surface covering has been cast on site;

FIG. 14 is a schematic, perspective view of a straight-edge arrangement operative to produce a patterned covering;

FIG. 15 illustrates schematically and from above a seventh heat-exchanger arrangement where an inner floor is placed on sheets incorporating channel parts, the upper layer of the floor being removed in FIG. 15, however; and FIG. 16 is a sectional view of FIG. 15, with the upper layer shown.

Figure 1:
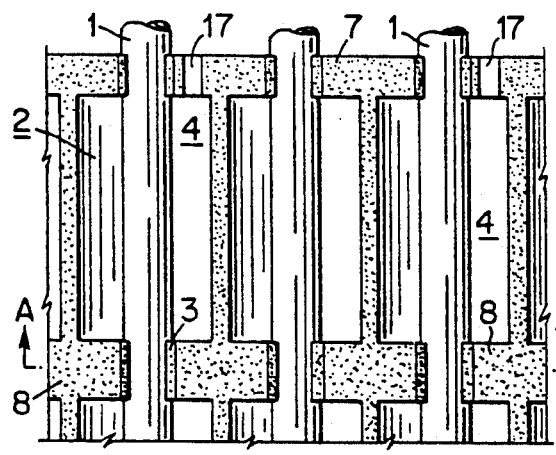
FIG. 1 illustrates a channel system 1 comprising a plurality of channel parts, such as hose parts. The channel parts are intended to convey an energy-carrying medium (not shown) and are supported on a pre-fabricated sheet or slab 2 of heat-insulating material, such as so-called cellular plastic material, which forms a channel-part supporting base member.

The illustrated arrangement also includes short channel-part locking grooves 3 incorporated in the sheet or slab 2. The width of respective locking grooves will preferably be slightly smaller than the width of a channel part, when appropriate the diameter of said channel part, as illustrated in FIG. 1. The supporting sheet or slab will preferably be made from a material which will as to provide a degree of resilience to the walls of the locking grooves, such that said grooves will open against a spring force when a channel part 1 is pressed thereinto, therewith holding the channel part to a certain extent.

Locking grooves of mutually different configurations are described hereinafter with reference to FIGS. 9a-9h.

According to one preferred embodiment, the locking grooves are formed in channel-part support grooves 4. The grooves 4 are preferably comparatively wide. In the FIG. 1 embodiment, the grooves widen essentially from a bottom part 5, so that the upwardly facing mouth 6 of each groove will have a width in the order of twice the largest cross-dimension of a channel part, in this case the diameter of said channel part.

The embodiment illustrated in FIG. 1 thus comprises a sheet or slab 2 in which a plurality of essentially parallel supporting grooves 4 extend side-by-side between mutually opposing end walls 7, of which one is shown in FIG. 1, and at least one locking groove 3 is provided in each supporting groove 4 between said end walls. In the illustrated embodiment, the end walls 7 are configured as locking grooves in connection with said supporting grooves 4. Also shown are locking grooves 3 included in a transverse wall 8 in said supporting grooves, said wall 8 blocking said grooves, with the exception of the locking groove.

Similar to the FIG. 1 embodiment, the cross-sectional shape of the locking grooves conforms to the cross-sectional shape of the channel parts, therewith enabling water to be retained for a longer period of time between such locking grooves when a channel part is inserted into the locking grooves 3.

Figure 3:
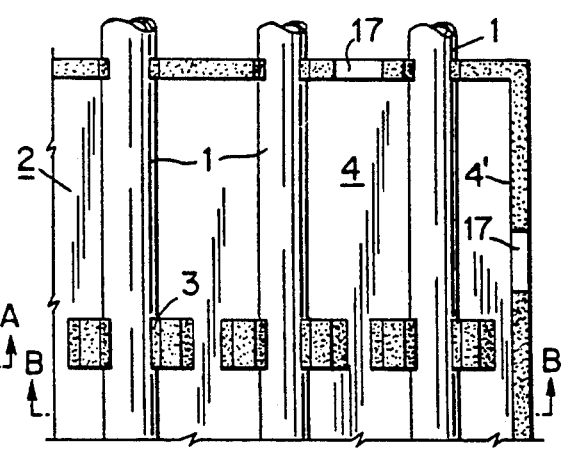
FIG. 3 illustrates schematically part of a second embodiment of a channel-part supporting sheet, or slab said sheet being seen from above.
Figure 2:
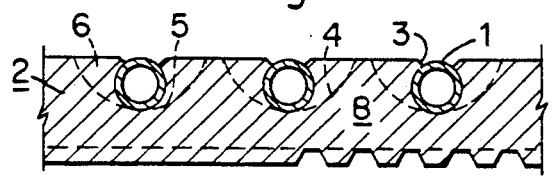
FIG. 2 is a sectional view taken on the line A—A of FIG. 1.
Figure 4:
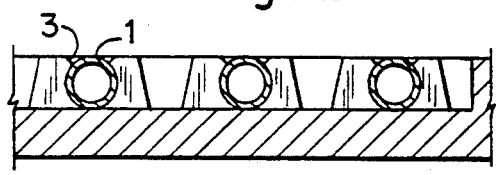
FIG. 4 is a sectional view taken on the line B—B in FIG. 3.

FIGS. 3 and 4 illustrate an embodiment in which the channel parts 1 lie in a common supporting groove 4 between rim parts 4' which extend substantially parallel with the channel parts.

Figure 5:
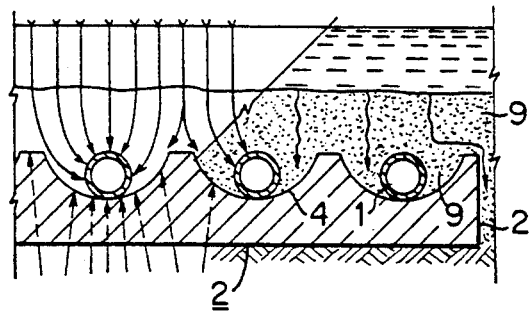
FIG. 5 is a schematic, vertical sectional view taken transversely to the longitudinal direction of the channel parts and shows a first embodiment of a heat-exchanger arrangement where sheets and channel parts are covered with a layer of moisture-retaining filler material.
Figure 6:
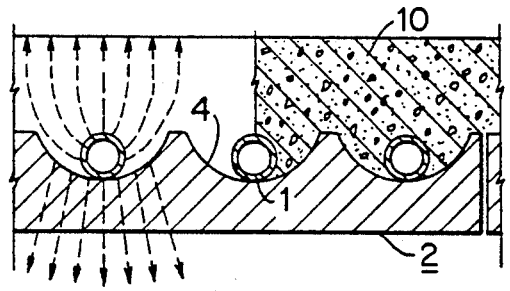
FIG. 6 is a schematic, sectional view essentially similar to FIG. 1 and showing a second embodiment of a heat-exchanger arrangement where an upper layer of discrete plates, for instance, concrete slabs, are disposed.

In many cases of several applications, such as in the case of artificially frozen ice rinks for instance, a moisture-retaining filler material 9, such as sand, is appropriately placed around the channel parts in said grooves 4, as illustrated in FIGS. 5 and 6. This material is intended to be substantially saturated with water, with the intention of achieving good heat transfer between the channel parts and the surrounding medium or media. In such applications, the sheets or slabs are also preferably covered with a layer of moisture-retaining filler material 9. Grooves 4, such as the grooves 4 illustrated in FIG. 9a-FIG. 9d, may also conceivably form locking grooves, Channel parts 1 are being intended to be held firmly, to some extent, in these grooves with the aid of preferably of fine-grain filler material. In this case, the locking grooves, at least at certain parts of the groove cross-section, will therefore be noticeably wider than the channel parts.

The embodiment illustrated in FIG. 6 includes discrete concrete slabs 9' which are laid on filler material 9 to form an upper covering.

The transportation of heat and water in the FIG. 5 and 6 embodiment will be described hereinafter.

Figure 7:
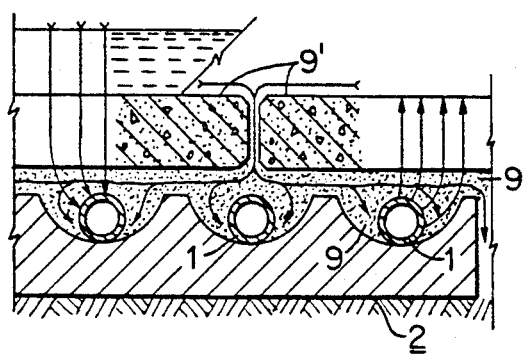
FIG. 7 is a schematic sectional view essentially similar to FIG. 5 and showing a third embodiment of a heat-exchanger arrangement where concrete has been cast over sheets and channel parts.
Figure 8:
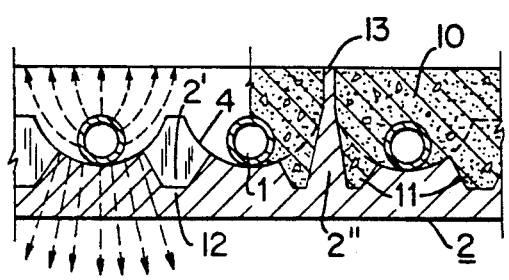
FIG. 8 is a schematic sectional view essentially similar to FIG. 5, of a fourth embodiment of a heat-exchanger arrangement, where concrete has been cast over sheets and channel parts and where buttress-like reinforcements and screeding abutments are provided.

In the FIGS. 7 and 8 embodiments, concrete 10 is cast over the sheets or slabs 2 which support the channel parts 1. In the FIG. 7 embodiment, a relatively thick concrete layer has been cast, in order to achieve the requisite mechanical strength.

In order to achieve the requisite mechanical strength and anchorages between slabs 2 and concrete 10, the slabs can be provided with recesses 2' and/or promontories 2" which are respectively filled with or embedded in concrete, said recesses and/or promontories being disposed in a given pattern. This will enable a somewhat thinner concrete layer to be used. In the case of the FIG. 8 embodiment, concrete reinforcing buttresses 11 are used to form a pattern of thickenings of concrete layer in the slabs or sheets, a substantial part of the thickenings being disposed in slab parts 12 between said grooves 4. FIG. 8 also shows that the slabs or sheets may include screeding abutment elements or straight-edges 13 which form an up-standing framework and which are intended to form abutments for coaction with strikers during a concrete casting operation and also to divide the concrete surface into smaller sections. The straight-edges 13 also form dilation joints which function to take-up movement in the concrete surface. The straight-edges or plates 13 can also be arranged adjacent edge parts of the slabs or sheets and more centrally of said edge parts.

FIG. 9 illustrates various groove embodiments and shows the embodiments FIGS. 9a-9d as examples of configurations in which a low thermally active mass is disposed between the pipes, while the embodiment FIGS. 9e-9g are examples of a channel-part locking where the groove has been expanded when pressing a channel part thereinto, in order to achieve long term locking of the channel part. The locking surfaces of the locking groove need only reach to about 60% of the diameter of the channel-part concerned, as in FIG. 9g. An example of densely packed channel-parts locked in respective locking grooves is shown in the illustration FIG. 9h.

FIGS. 10 and 11 illustrate a slab or sheet embodiment in which studs 14 are operative to clamp channel parts firmly therebetween. The size, diameter, of the studs, can, of course, be varied and may well be greater than that illustrated in FIGS. 10 and 11, seen in relation to the diameter of the channel-parts. The studs may conceivably be distributed in a pattern which will create a "universal slab", in which channel parts may extend in any desired direction and also turn or swing between the studs.

FIGS. 12 and 13 illustrate two different embodiments of on-site cast outer coverings, where concrete is cast on sheets or slabs 2 having channel parts 1 disposed therein. The FIG. 12 embodiment has a wave-shape transversely to the direction in which the channel parts extend. The FIG. 13 has a stepped configuration, as shown highly schematically in FIG. 14, formed with the aid of upstanding rim-elements/striker-straight edges 15 in the extension direction of the channel parts.

FIGS. 15 and 16 illustrate arrangements using sheets or slabs in which the channel parts are accommodated in preferably essentially parabolic grooves 14, wherewith the ridges 4' between the grooves form supports for a floor surface 16 in the form of sheets, slabs 16 or the like and which incorporate locking grooves 3. The channel parts, the hoses, are preferably black, warm and dull, and radiate heat radially, said heat being reflected by preferably white and smooth, parabolic surfaces of the sheet or slab material, the cellular plastic material. In this case, heat transfer is effected by radiation and convection. Ventilating slots are preferably provided on the undersurface of the sheets or slabs.

The method and the manner of operation of the arrangement according to the invention will be understood essentially from the aforegoing.

Because the channel system 1 is disposed on heat-insulating sheets or slabs 2, the mutual effect between the channel system and the substrate or base support, i.e. the ground or the like, will be greatly reduced. The left-hand part of the FIG. 5 illustration shows the transport of heat from the surface of the arrangement, the ice, in full-line arrows and also shows to a limited extent the transportation of heat from the underlying ground through the sheet or slab 2. Shown to the right in FIG. 5 is, among other things, the drainage of water in joints located between respective sheets or slabs 2. The filler material can thus be saturated with moisture through grooves 4. Surplus water drains-off through the joints between respective sheets or slabs. This moisture saturation provides highly efficient heat transfer between the channel parts and the surrounding medium or media.

As illustrated in FIGS. 7 and 8, concrete can be cast directly onto the sheets or slabs containing channel-parts, wherewith a pattern of reinforcements 11 can be employed to decrease the average thickness of the concrete layer while maintaining mechanical strength, as illustrated in FIG. 1, and therewith also reducing the amount of thermally active mass. The striker-abutment elements 13 form spacer elements, both when striking-off surplus concrete and when dividing the concrete surface into sections. The striker-abutment elements can be left in the concrete surface, scraped out slightly and replaced with other material, such as concrete.

Placing of the channel parts 1 and the durability or permanence of the channel system with regard to its configuration are facilitated by the locking grooves 3. Thus, the channel parts, the hoses, can be readily tramped into the locking grooves during successive placing of said channel parts, therewith fixating the hose or channel parts against both axial and radial movement.

When the channel parts are pressed into respective locking grooves, said locking grooves preferably having an essentially U-shaped cross-section, the grooves will first widen and then exert a clamping action on said channel parts, so as to prevent movement of said parts and, inter alia, upward deflection thereof. The frictional forces exerted by the locking grooves, even short locking grooves, are sufficiently large to impede changes in length of the channel parts during the fitting of said parts and even when the rink, pitch or like area is used in the summer months as, for instance, a football pitch.

Because the channel-parts fit sealingly into the locking grooves, there is formed a water-retaining damming construction which results in moisture saturation of the filler material used.

The channel system is constructed by placing sheets or slabs 2 sequentially in the intended direction of extension of the channel parts, several rows of sheets or slabs being placed adjacent one another. The channel-parts, the hose-parts, are laid in endless loops of reciprocating lengths having an 180°-swing between each pair of sequential lengths extending in the flow direction of the energy-carrying medium, wherewith the channel lengths of one such channel pair need not necessarily lie adjacent to one another, but that the channel parts may be laid so that, upon completion, one or more channel lengths will be located between the two lengths of one such pair. In this case, the radius of curvature in each 180°-swing can be made larger than when the channel length of each channel pair shall lie immediately adjacent one another.

It will be seen from the aforegoing that the inventive method and arrangement afford important advantages of the kind mentioned in the introduction.

The invention has been described in the aforegoing with reference to exemplifying embodiments thereof. It will be understood, however, that other embodiments and minor modifications to the illustrated embodiments are conceivable within the scope of the inventive concept.

The sheets or slabs 2 will preferably be made of expanded styrene, propylene or ethylene plastic, although said sheets or slabs may also be cast directly in moulds from foamed polyurethane or polystyrene.

Working from smooth sheets or slabs is also possible principle. The slab material will preferably be relatively hard.

Due, among other things, to the sealing contact achieved between locking groove and channel parts, there is obtained a damming effect which enables the filler material used to be saturated with moisture, resulting in good heat transfer and effective use of the refrigerant concerned. This damming effect can be amplified by providing a raised rim 4' around the outer edges of the sheet or slab, as a complement to the sealing locking grooves etc., as illustrated in FIGS. 3 and 4.

It is preferred in many instances to form in the outer edges of the sheets or slabs 2 draining slots 17 which lead to the underlying substrate or foundation, as shown in FIGS. 1, 3 and 4. Surplus water in the gravel layer, or rain water, is therewith enabled to drain horizontally through the gravel layer up to the drainage slots, and there pass vertically through the gravel-filled slots down onto a drainage foundation. Naturally, the drainage slots 17 can be formed in several different ways and may have different sizes and different position patterns.

According to one preferred embodiment, a number of the aforedescribed constructional elements, i.e. grooves 4, locking grooves 3, recesses which form buttress-like reinforcements 11 and drainage columns in outer edges, are formed integrally with the sheets or slabs.

Consequently, the invention is not restricted to the aforedescribed and illustrated exemplifying embodiments thereof, since modifications and changes can be made within the scope of the accompanying claims.

I claim:

1. A heat-exchange method for making artificially frozen ice areas in the form of ice-rinks, comprising: advancing an energy-carrying medium through a channel system comprising hose-like channel parts; providing a base for the frozen ice area comprising at least one pre-fabricated flat slab of heat insulating material with a pair of opposed end edges and with a plurality of parallel, spaced-apart supporting grooves for the channel parts; said supporting grooves being made integral with the slab and having open tops and concave, curvature cross sections, extending along the upper surface of the flat slab between the opposed slab end edges; providing, on the upper surface of the slab, within the supporting grooves, a plurality of locking groove units with locking grooves, structurally integral with the slab and spaced-apart along each supporting groove, the locking grooves of the locking groove units being made with a partially circular cross-section, the upper portion being open and the lower portion being coextensive with the lower most curved surface of the associated supporting groove; extending, disposing, supporting and holding the channel parts in lengths disposed in mutually parallel side-by-side relationship on said at least one pre-fabricated slab of heat-insulating material; and, when disposing the channel parts on the slab, inserting the lengths of channel parts into the supporting grooves and into the spaced-apart locking grooves associated with the supporting groove formed in said slab, each of said locking groove units having a short length in the direction of extension of the channel part when placed in the locking groove so the locking grooves engage only a minor part of the total length of the channel parts; the open upper part of said supporting grooves being wider than the cross-sectional dimension of the hose-like channel part; making each locking groove unit (3) resilient so it is widened against a resilient spring-like biasing force when the channel part (1) is inserted and forced into the locking groove, to thereby firmly hold the channel part in the locking groove, axially as well as radially, and forming a water-retaining damming construction between the channel part and the bottom of the associated supporting groove, to thereby provide a sealed fit of the channel part (1) along the associated locking groove units and the associated supporting groove; placing moisture-retaining filler material (9) selected from material including sand and gravel, around the channel parts and covering the slab; and substantially saturating said filler material with water.

2. A method according to claim 1, further including the step of casting concrete (10) over the slab having channel parts incorporated therein.

3. A method according to claim 2, further including the steps of mutually anchoring the slab (2) and the concrete (10) with the aid of recesses (2') and promontories (2") formed in said slab, and providing that the recesses and promontories are filled with and cast in said concrete.

4. A method according to claim 3, including the step of using the promontories (2") as striker-abutment means (13) during a concrete casting operation.

5. A heat exchange method as defined in claim 1, wherein said slab material is a cellular plastic material.

6. A heat-exchanger arrangement for creating artificially frozen ice areas, in the form of ice-rinks, in which an energy-carrying medium is forced along a channel system comprising: lengths of mutually adjacent parallel hose-like channel parts, and at least one pre-fabricated slab of heat-insulating material with opposed end edges, having a plurality of concave curvature supporting grooves open along their upper side, extending between two opposed end edges of said slab, for supporting said lengths of channel parts, said slab including a plurality of structurally integral channel-part locking groove units including open upper side locking grooves with a concave inner curvature surface, the axis of the locking grooves extending in the intended direction of the lengths of channel parts, the locking groove units being located in the supporting grooves on said slab and spaced-apart along the supporting grooves, the total of all locking grooves engaging only a minor dimension of the total length of said channel parts, said locking groove units being short in their direction along the length of said supporting grooves; said locking groove units being disposed in associated supporting grooves with the lower portion of the inner surface being coextensive the lower curved surface of the associated supporting grooves; said supporting grooves at their open upper side being wider than the cross-sectional dimension of a said hose-like channel part, and wherein the locking groove units (3) have a resilience enabling the locking grooves to be widened against a spring-like bias force when a channel part (1) is inserted and forced into the locking groove unit, thereby firmly holding the inserted channel part tight against axially displacement as well as against radial displacement, the lengths of channel parts thereby fitting sealingly in and coextensive with the base of the associated locking grooves and the associated supporting groove units; each said locking groove contour conforming closely to the cross-sectional shape of the associated held channel part, so that a water-retaining damming construction between the channel part, the locking groove units and the associated supporting groove is formed; a moisture-retaining filler material (9), selected from a group of material comprising sand and gravel, is placed around the channel parts and covers the entire slab and channel parts; and water is added to said filler material so that the filler material is substantially saturated with water.

7. An arrangement according to claim 6, wherein the upwardly facing open side of each of said supporting grooves will have a width in the order of twice the largest cross-sectional width of a channel part.

8. An arrangement according to claim 6, wherein said slab (2) opposed spaced-apart edges have end parts (7), and also includes a plurality of said mutually adjacent and essentially mutually parallel supporting grooves (4) which extend between said two end parts (7) of the slab, wherein at least one of said locking groove units (3) is provided in each of said supporting grooves (4) extending between said end parts.

9. An arrangement according to claim 8, wherein said end parts (7) are configured with integral locking grooves (3) in connection and having a lower locking groove portion coextensive with said associated supporting grooves (4).

10. An arrangement according to claim 6, wherein a transverse wall is provided in said slab across said supporting grooves, and a locking groove unit (3) is incorporated in said transverse wall (8) coextensive with a said supporting groove (4), said transverse wall blocking said supporting groove with the exception of said locking groove.

11. An arrangement according to claim 6 characterized in that said sheet or slab containing said channel parts is covered with a moisture-retaining filler material (9).

12. An arrangement according to claim 11, characterized in that the slab includes recesses (2') and promontories (2") which are respectively filled with concrete (10) achieving anchorage between said sheets and said concrete, said recesses and promontories respectively being disposed in a given pattern.

13. An arrangement according to claim 12, characterized in that concrete buttress-like reinforcements (11) are submerged as a pattern of thickenings of the concrete layer in said slab, wherein a substantial part of the buttress-like reinforcements (11) are disposed in slab parts (12) located between grooves (3, 4) in said sheet or slab.

14. An arrangement according to claim 11, characterized in that the concrete surface is divided into smaller sections.

15. An arrangement according to claim 12, characterized in that promontories (2") to from striker-abutment means during the concrete casting operation.

16. An arrangement according to claim 12, characterized in that promontories (2") form a framework of striker abutments which divide the cast concrete layer into sections.

17. An arrangement according to claim 6, wherein the outer edges of the slabs (2) are provided with drainage slots (17) operative to allow surplus water to drain-off towards the foundation supporting said slabs.

18. An arrangement according to claim 6, wherein supporting grooves (4), locking grooves (3), recesses which form buttress-like reinforcements (11) and drainage slots in outer edges are formed integrally with the slabs (2).

19. A heat exchanger arrangement as defined in claim 6, wherein said slab is made from a cellular plastic material.

* * * * *

UNITED STATES PATENT AND TRADEMARK OFFICE
CERTIFICATE OF CORRECTION

PATENT NO. : 5,327,737
DATED : July 12, 1994
INVENTOR(S) : BENGT V. EGGEMAR

It is certified that error appears in the above-identified patent and that said Letters Patent is hereby corrected as shown below:

Column 10, cancel lines 4-7 (claim 11), and insert the following correct claim:

--11. An arrangement according to claim 6, characterized in that a concrete layer (10) is cast over the slab having channel parts (1) incorporated therein.--.

Column 10, line 25, cancel "to from" and substitute --form--.

Signed and Sealed this

Thirteenth Day of September, 1994

Attest:

Attesting Officer

BRUCE LEHMAN

Commissioner of Patents and Trademarks